(12) United States Patent
Ainslie et al.

(10) Patent No.: US 10,094,292 B2
(45) Date of Patent: Oct. 9, 2018

(54) METHOD OF ACCELERATION CONTROL DURING APU STARTING

(75) Inventors: Walter Ernest Ainslie, Ramona, CA (US); Andre M. Ajami, Spring Valley, CA (US); Mujtaba T. Saifuddin, Corona, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1958 days.

(21) Appl. No.: 13/410,752

(22) Filed: Mar. 2, 2012

(65) Prior Publication Data

US 2013/0227959 A1 Sep. 5, 2013

(51) Int. Cl.
*F02C 7/26* (2006.01)
*F02C 9/26* (2006.01)

(52) U.S. Cl.
CPC .............. *F02C 7/26* (2013.01); *F02C 9/26* (2013.01); *F05D 2220/50* (2013.01); *Y02T 50/671* (2013.01)

(58) Field of Classification Search
CPC ...... F02C 9/26; F02C 9/28; F02C 9/50; F02C 7/26; B64D 2033/0213; B64D 2041/002; F05D 2220/50; F05D 2260/85
USPC .......................................................... 60/778
See application file for complete search history.

(56) References Cited

U.S. PATENT DOCUMENTS

| | | | | |
|---|---|---|---|---|
| 4,490,791 A | * | 12/1984 | Morrison | 701/100 |
| 5,123,239 A | * | 6/1992 | Rodgers | 60/778 |
| 5,165,223 A | | 11/1992 | Ingham et al. | |
| 5,274,996 A | | 1/1994 | Goff et al. | |
| 5,303,541 A | | 4/1994 | Goff et al. | |
| 6,836,086 B1 | * | 12/2004 | Goldberg et al. | 318/141 |
| 7,168,254 B2 | | 1/2007 | Riley | |
| 7,331,169 B2 | | 2/2008 | Riley | |
| 7,340,901 B2 | | 3/2008 | Riley | |
| 7,367,193 B1 | | 5/2008 | Thompson | |
| 7,690,205 B2 | | 4/2010 | Delaloye et al. | |
| 2004/0122581 A1 | * | 6/2004 | Hartzheim | 701/100 |
| 2004/0200207 A1 | * | 10/2004 | McKelvey et al. | 60/39.281 |
| 2010/0293961 A1 | | 11/2010 | Tong et al. | |

* cited by examiner

*Primary Examiner* — Ehud Gartenberg
*Assistant Examiner* — Thomas Burke
(74) *Attorney, Agent, or Firm* — Kinney & Lange, P.A.

(57) ABSTRACT

A method for controlling fuel flow to a gas turbine engine during starting includes monitoring acceleration of the gas turbine engine to determine actual acceleration value, and calculating a fuel flow rate for a setpoint acceleration using the actual acceleration value as a factor. The method further includes commanding the calculated fuel flow for the setpoint acceleration to the gas turbine engine.

15 Claims, 3 Drawing Sheets

METHOD OF ACCELERATION CONTROL DURING APU STARTING

STATEMENT OF GOVERNMENT INTEREST

This invention was made with government support under Contract No. N00019-06-C-0081 awarded by the Navy. The government has certain rights in the invention.

BACKGROUND

This disclosure relates generally to gas turbine engines, and more specifically to methods for controlling fuel flow during starting of gas turbine engines.

Auxiliary power units (APUs) are gas turbine engines used on aircraft for main engine starting, to provide in-flight engine restart assistance, and to supply power and compressed air for ground and in-flight operations. During a normal APU start, a starting system (e.g. hydraulic system, electric system, or pneumatic system) operates to produce initial rotation of the APU. Rotation of the APU introduces air into the compression section where it is compressed and discharged into the combustion section. As the starting system accelerates the APU, a fuel delivery pump (e.g. gearbox driven) provides fuel flow to the APU combustion section. Igniters are then energized to ignite the fuel air mixture in the APU combustion section.

To achieve successful ignition, engine speed and fuel delivery must be coordinated to provide an air fuel mass mixture at the igniter which is capable of sustaining combustion. The range of engine speeds at which starting is most likely to occur is referred to as the "light off window" and typically ranges from 5%-20% of rated engine speed. If the starting system accelerates too quickly through the light off window and/or if insufficient fuel is provided to the combustor, then ignition will fail and the APU will experience a hung start. Upon successful ignition, and once the APU has reached a self-sustaining speed (e.g. 50% of rated engine speed), the starting system is disengaged and the APU accelerates itself to a normal operating speed.

SUMMARY

A method for controlling fuel flow to a gas turbine engine during starting includes monitoring acceleration of the gas turbine engine to determine an actual acceleration value, and calculating a fuel flow rate for a setpoint acceleration using the actual acceleration value as a factor. The method further includes commanding the calculated fuel flow rate for the gas turbine engine.

A method for controlling fuel flow to an auxiliary power unit during starting includes activating a starter for the auxiliary power unit. The method further includes monitoring speed of the auxiliary power unit, and measuring an amount of time elapsed to reach a set speed to determine an actual acceleration of the auxiliary power unit. Additionally, the method includes populating an NDOT look up table with the actual acceleration of the auxiliary power unit, and controlling a rate of fuel flow to the auxiliary power unit during starting.

An auxiliary power unit includes a starter for starting rotation of an engine, a speed sensor for sensing engine speed, and a fuel metering valve for metering fuel flow to the engine. The auxiliary power unit further includes a controller connected to the starter, the speed sensor, and the fuel metering valve. The controller receives a sensed engine speed and calculates acceleration of the engine. The controller commands a fuel flow rate to the fuel metering valve, where the fuel flow rate is determined in part by the calculated acceleration of the engine.

DETAILED DESCRIPTION

Figure 1:
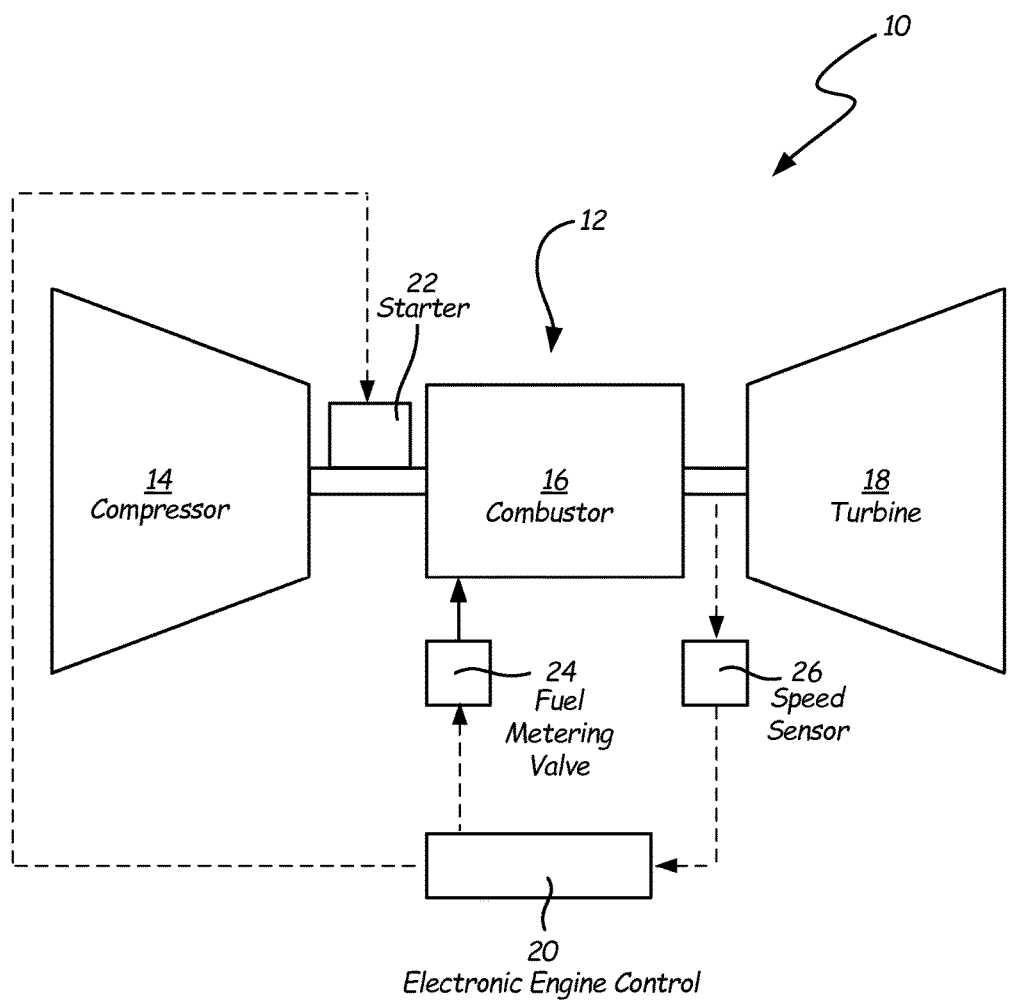
FIG. 1 is a schematic diagram of an auxiliary power unit.

FIG. 1 is a schematic diagram of an exemplary auxiliary power unit (APU) system 10. APU system 10 includes engine 12 having compressor 14, combustor 16, and turbine 18, electronic engine control (EEC) 20, starter 22, fuel metering valve 24, and speed sensor 26. Speed sensor 26 provides information about engine 12 speed to EEC 20, and EEC 20 commands fuel metering valve 24 to provide fuel to combustor 16 at a fuel flow rate.

As shown in FIG. 1, APU system 10 includes engine 12. Engine 12 is a gas turbine engine and includes compressor 14, combustor 16, and turbine 18 in flow series. Compressor 14 is located upstream of, and is fluidly connected to, combustor 16. Combustor 16 is upstream of, and is fluidly connected to, turbine 18. Compressor 14 and turbine 18 are mechanically connected by a common rotational shaft. When operating, compressor 14 draws in and compresses ambient air. The compressed air is mixed with fuel and ignited in combustor 16 to produce high-energy combusted air. The combusted air is expanded in turbine 18, which rotates to drive the compressor 14 and provide additional power through an output shaft (not shown). Typically a gearbox is mounted to the output shaft of engine 12 for driving accessory generators and various pumps on, for example, an aircraft.

Figure 2:
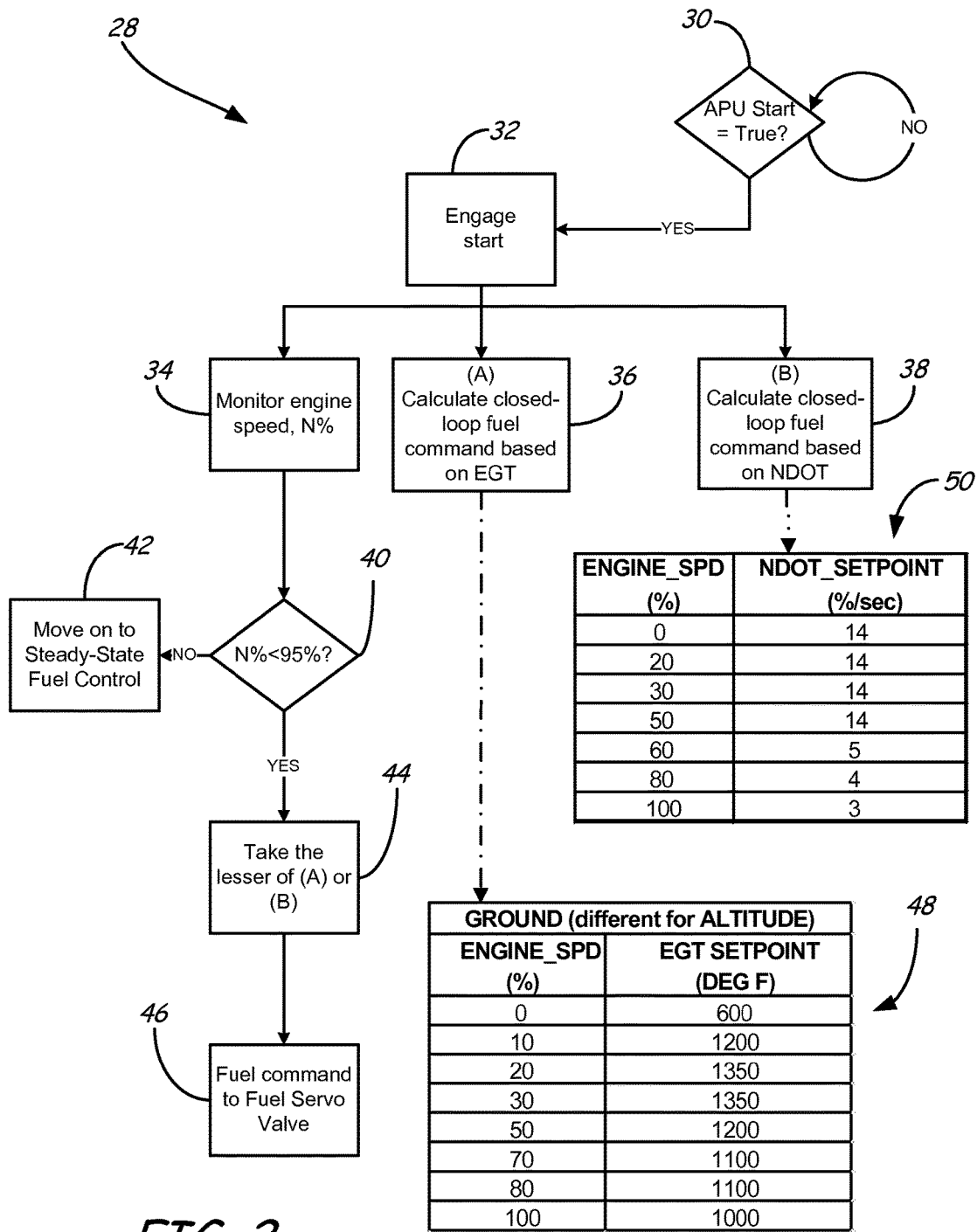
FIG. 2 is a flow chart depicting a method of fuel flow control for an auxiliary power unit in accordance with the prior art.
Figure 3:
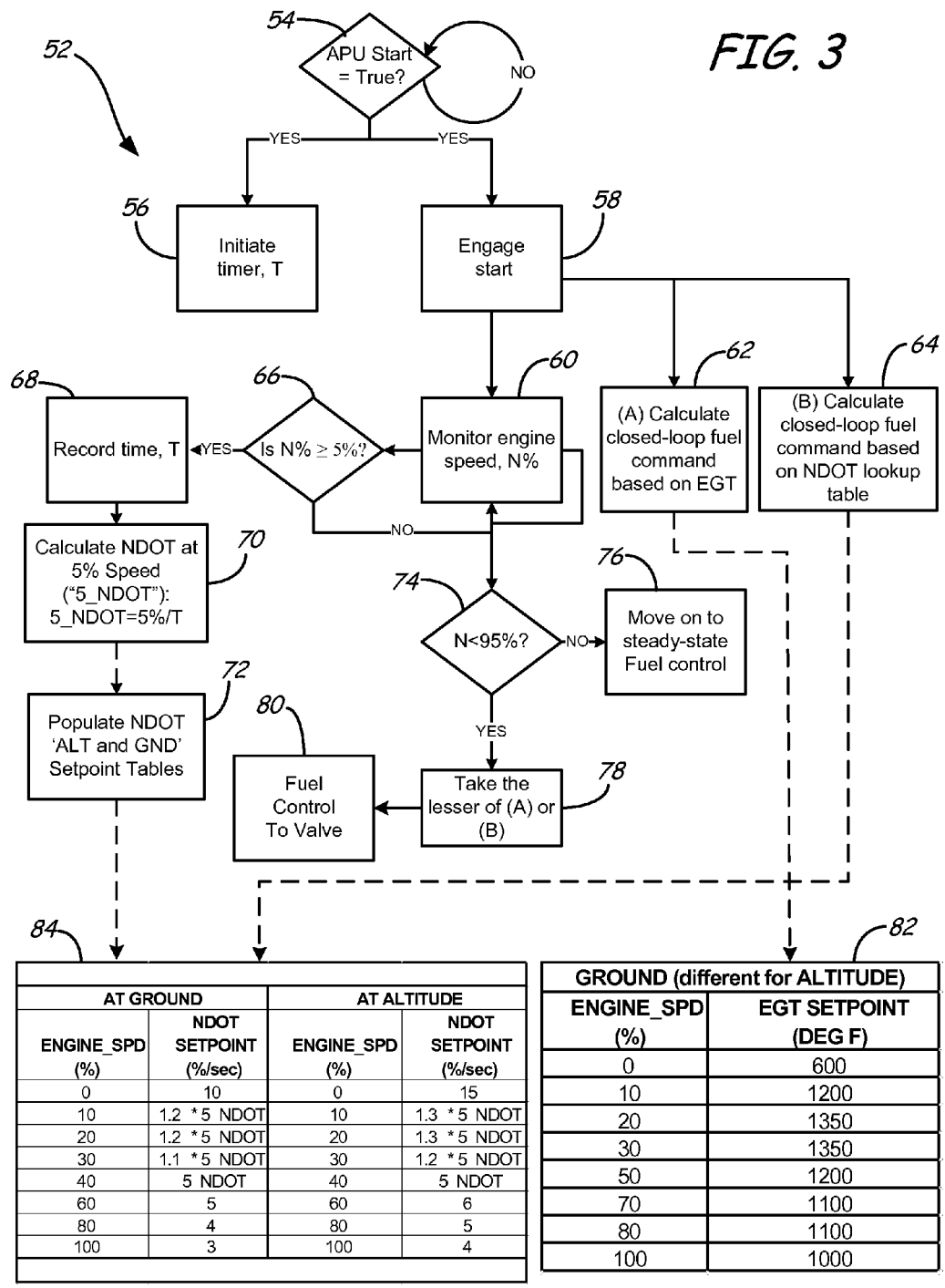
FIG. 3 is a flow chart depicting a method of fuel flow control for an auxiliary power unit in accordance with the present disclosure.

EEC 20 controls operations of engine 12. In embodiments, the EEC 20 may be programmed to implement the methods of fuel flow control as depicted in FIGS. 2 and 3. The EEC 20 has a plurality of inputs and outputs. In the simplified schematic of FIG. 1, EEC 20 is electrically connected to starter 22, fuel metering valve 24, and speed sensor 26. Starter 22 is mechanically connected to engine 12 (e.g. the main rotation shaft of engine 12) and is configured to rotate engine 12 upon a command from EEC 20. Starter 22 can be part of a hydraulic starting system, an electric starting system, or a pneumatic starting system. Fuel metering valve 24 is part of a fuel system for engine 12 and is fluidly connected to conventional fuel system components such as a fuel tank, one or more fuel pumps, one or more fuel/oil heat exchanger, etc. (not shown). Fuel metering valve 24 is fluidly connected to, and meters the flow of fuel to, combustor 16. Speed sensor 26 is part of a monitoring system for engine 12. Speed sensor 26 is connected to engine 12 (e.g. the main rotation shaft of engine 12) and monitors speed (e.g. counts revolutions per minute) of engine 12. Successful starting of engine 12 requires that EEC 20 coordinate fuel flow and engine speed. EEC 20 commands fuel flow to combustor 16 through fuel metering valve 24 and monitors engine speed through speed sensor 26. The EEC 20 methodology of monitoring engine speed and commanding fuel flow is described below with reference to FIG. 2 and FIG. 3.

FIG. 2 is a flow chart depicting a method 28 of fuel flow control for an auxiliary power unit (APU) system (such as APU system 10 of FIG. 1) in accordance with the prior art. Method 28 of fuel flow control includes a plurality of steps (steps 30-46) and two look up tables EGT (exhaust gas temperature) look up table 48 and NDOT (acceleration) look up table 50). An electronic engine control (EEC) (such as EEC 20 of FIG. 1) performs method 28 of fuel flow control to an engine (such as engine 12 of FIG. 1) during APU starting. The EEC receives information regarding speed of the engine from a speed sensor (such as speed sensor 26 of FIG. 1), and determines an amount of fuel to command to the combustor (such as combustor 16 of FIG. 1) through a fuel metering valve (such as fuel metering valve 24 of FIG. 1).

Method 28 begins with step 30. At step 30, the EEC inquires whether 'APU start=true?'. If the EEC determines that the answer is 'NO' (e.g. the EEC has not received an APU start command), then the EEC will return to step 30. Once the EEC determines the answer is 'YES' (e.g. the APU start command has been received), then the EEC proceeds to step 32.

At step 32, the EEC engages a starting system (hydraulic, electric, or pneumatic) having a starter (such as starter 22 of FIG. 1) to begin rotation of the engine. During step 32, the EEC is activating control valves and the like. In the example of a hydraulic starting system, the EEC will command control values of an accumulator to open. Other elements associated with engine starting (e.g. fuel metering valve, exciter/igniter, etc.) are also engaged at step 32. After the starting system is engaged, the EEC proceeds to step 34.

At step 34, the EEC monitors engine speed to determine the current engine speed 'N %'. Engine speed can be measured by capturing a frequency and voltage signal from a speed sensor (such as speed sensor 26 of FIG. 1) attached to the engine, and converting the signal to engineering units (e.g. revolutions per minute). Engine speed is expressed as a percent of maximum rated engine speed 'N %'. Step 34 occurs continuously during APU starting (i.e. until APU reaches a normal operating speed such as 95%). The current engine speed 'N %' determined at step 34 can be used as an input for calculations performed in both step 36 and step 38.

At step 36, the EEC calculates fuel flow rate 'A', which is a closed-loop fuel command based on exhaust gas temperature (EGT). During step 36, the EEC looks up the current engine speed (as measured by a speed sensor, see step 34) in EGT look up table 48. Current engine speed as a percent of maximum rated engine speed is selected from a first column 'ENGINE_SPD' (%)'. The selected current engine speed row is associated with an 'EGT SETPOINT (DEG F)' in a second column. This EGT set point is then associated with a rate of fuel flow (in pounds per hour), which is rate 'A'. More specifically, the EEC feeds the desired EGT setpoint (from look up table 48) into the control loop and calculates an 'error' value (the difference between current measured EGT and the desired EGT setpoint). This 'error' is then fed into a proportional-integral loop that aims to close the gap of this error by commanding the necessary fuel flow, which is rate 'A'. As the fuel flow is modulated, the current measured EGT should approach the desired EGT setpoint (i.e. the error gets smaller). As the error gets smaller and smaller with each calculation cycle, the fuel flow changes get smaller and smaller. Accordingly, rate 'A' can be used as a fuel flow rate command to a fuel metering valve controlling fuel flow into the combustor of the APU. Step 36 occurs continuously during APU starting (i.e. until APU reaches a normal operating speed such as 95%).

At step 38, the EEC calculates fuel flow rate 'B', which is a closed-loop fuel command based on NDOT (change in engine speed over time, or acceleration). During step 38, the EEC looks up current engine speed (as measured by a speed sensor, see step 34) in NDOT look up table 50. Current engine speed as a percent of maximum engine speed is selected from a first column 'ENGINE_SPD' (%)'. The selected current engine speed row is associated with an 'NDOT_SETPOINT (%/sec)' in a second column. This NDOT set point is then associated with a certain rate of fuel flow (in pounds per hour), which is rate 'B'. More specifically, the EEC feeds the desired NDOT setpoint (from look up table 50) into the control loop and calculates an 'error' value (the difference between current measured NDOT and the desired NDOT setpoint). This 'error' is then fed into a proportional-integral loop that aims to close the gap of this error by commanding the necessary fuel flow, which is rate 'B'. As the fuel flow is modulated, the current measured NDOT should approach the desired NDOT setpoint (i.e. the error gets smaller). As the error gets smaller and smaller with each calculation cycle, the fuel flow changes get smaller and smaller. Accordingly, rate 'B' can be used as a fuel flow rate command to a fuel metering valve controlling fuel flow into the combustor of the APU. Step 38 occurs continuously during APU starting (i.e. until APU reaches a normal operating speed such as 95%). Step 38 and step 36 occur simultaneously. Once rate A is calculated by step 36 and rate B is calculated by step 38, the EEC proceeds to step 40.

At step 40, the EEC inquires whether 'N %<95%'. Current engine speed was determined during step 34 and is now compared to 95% of maximum rated speed. If the answer is 'NO' (i.e. current engine speed is greater than 95% of rated engine speed), then the EEC proceeds to step 42. If the answer is 'YES' (i.e. current engine speed is less than 95% of rated engine speed), then the EEC proceeds to step 44.

At step 42, the EEC moves on to 'Steady State Fuel Control'. Once the APU has reached 95% of maximum rated speed (determined at step 40), method 28 of fuel flow control is supplanted with a different method of fuel control (not depicted) used during steady state operation of the APU.

At step 44, the EEC takes the lesser of rate 'A' and rate 'B'. If calculations in step 36 produced a fuel flow rate 'A' that was less than a fuel flow rate 'B' produced by calculations in step 38, then rate 'A' would be chosen by the EEC. The contrast is also true. If calculations in step 38 produced a fuel flow rate 'B' that was less than a fuel flow rate 'A' produced by calculations in step 36, then rate 'B' would be chosen by the EEC. Once the lesser of rate 'A' and rate 'B' is determined, the EEC proceeds to step 46.

At step 46, the EEC sends a fuel command to a fuel metering valve. More specifically, the EEC commands whichever fuel flow rate was chosen in step 44 (rate 'A' or rate 'B') as the fuel flow rate for the fuel metering valve. The fuel metering valve then uses this commanded fuel flow rate to meter fuel to the combustor of the engine.

According to method 28, fuel command during APU engine starting is driven by either an EGT setpoint (rate 'A' calculated at step 36 using look up table 48) or a NDOT setpoint (rate 'B' calculated at step 38 using look up table 50). Whichever of the NDOT control loop output and the EGT control loop output results in a lower fuel flow rate, is chosen as the desired fuel flow rate at step 44 and commanded as the current fuel flow rate at step 46.

For successful ignition, engine speed and fuel delivery must be coordinated to provide an air fuel mass mixture at the igniter which is capable of sustaining combustion. Method 28 uses current engine speed as an input into EGT look up table 48 and NDOT look up table 50 to determine proper fuel flow during APU engine starting. Unfortunately, this methodology is less than ideal in part because the look-up tables are predetermined, set, static, and fixed. Often there is a fluctuation, discontinuity, or "hiccup" in fuel flow when using method 28, in part because the NDOT setpoint is based on an average desired acceleration. These hiccups in fuel flow can cause problems such as combustor instability, over temperature starts, and failure of the engine to reach full speed.

FIG. 3 is a flow chart depicting an alternate method 52 of fuel flow control for an auxiliary power unit (APU) system (such as APU system 10 of FIG. 1) in accordance with the present disclosure. Method 52 of fuel flow control includes a plurality of steps (steps 54-80) and two look up tables (EGT look up table 82 and NDOT look up table 84). An electronic engine control (EEC) (such as EEC 20 of FIG. 1) performs method 58 of fuel flow control to an engine (such as engine 12 of FIG. 1) during APU starting. The EEC receives information regarding speed of the engine from a speed sensor (such as speed sensor 26 of FIG. 1), and determines an amount of fuel to command to the combustor (such as combustor 16 of FIG. 1) through a fuel metering valve (such as fuel metering valve 24 of FIG. 1). In contrast to method 28 described above with reference to FIG. 2, method 52 of FIG. 3 considers actual acceleration of the engine during starting. The use of acceleration as an additional variable in determining fuel flow allows method 58 to better command fuel flow, thereby avoiding fuel flow hiccups.

Method 52 begins with step 54. At step 54, the EEC inquires whether 'APU start=true?'. If the EEC determines that the answer is 'NO' (e.g. the EEC has not received an APU start command), then the EEC will return to step 54. Once the EEC determines the answer is 'YES' (e.g. the APU start command has been received), then the EEC proceeds to step 56.

At step 56, the EEC initiates a timer. The timer can be part of the EEC or separate from the EEC. The timer is initiated (i.e. a clock is started or time is counted) in order to determine a time interval of an event from starting later on. Step 56 and step 58 occur simultaneously.

At step 58, the EEC engages a starting system (hydraulic, electric, or pneumatic) having a starter (such as starter 22 of FIG. 1) to begin rotation of the engine. During step 32, the EEC is activating control valves and the like. In the example of a hydraulic starting system, the EEC will command control values of an accumulator to open. Other elements associated with engine starting (e.g. fuel metering valve, exciter/igniter, etc.) are also engaged at step 58. After step 58, the EEC proceeds to step 60.

At step 60, the EEC monitors engine speed to determine the current engine speed 'N %'. Engine speed can be measured by capturing a frequency and voltage signal from a speed sensor (such as speed sensor 26 of FIG. 1) attached to the engine, which is converted into engineering units (e.g. revolutions per minute). Engine speed is expressed as a percent of maximum rated engine speed 'N %'. Step 60 occurs continuously during APU starting (i.e. until APU reaches a normal operating speed such as 95%). The current engine speed 'N %' determined at step 60 can be used as an input for calculations performed in both step 62 and step 64.

At step 62, the EEC calculates fuel flow rate 'A', which is a closed-loop fuel command based on exhaust gas temperature (EGT). During step 62, the EEC looks up the current engine speed (as measured by a speed sensor, see step 60) in EGT look up table 82. Current engine speed as a percent of maximum rated engine speed is selected from a first column 'ENGINE_SPD' (%)'. The selected current engine speed row is associated with an 'EGT SETPOINT (DEG F)' in a second column. This EGT set point is then associated with a certain rate of fuel flow (in pounds per hour), which is rate 'A'. More specifically, the EEC feeds the desired EGT setpoint (from look up table 82) into the control loop and calculates an 'error' value (the difference between current measured EGT and the desired EGT setpoint). This 'error' is then fed into a proportional-integral loop that aims to close the gap of this error by commanding the necessary fuel flow, which is rate 'A'. As the fuel flow is modulated, the current measured EGT should approach the desired EGT setpoint (i.e. the error gets smaller). As the error gets smaller and smaller with each calculation cycle, the fuel flow changes get smaller and smaller. Accordingly, rate 'A' can be used as a fuel flow rate command to a fuel metering valve controlling fuel flow into the combustor of the APU. Step 62 occurs continuously during APU starting (i.e. until APU reaches a normal operating speed).

At step 64, the EEC calculates fuel flow rate 'B', which is a closed-loop fuel command based on NDOT (change in engine speed over time or acceleration). During step 64, the EEC looks up current engine speed (as measured by a speed sensor, see step 60) in NDOT look up table 84. NDOT look up table 84 contains two sub tables, one for NDOT calculations at ground level, and one for NDOT calculations at altitude. Current engine speed as a percent of maximum engine speed is selected from a first column 'ENGINE_SPD' (%)' for the appropriate condition (at ground or at altitude). The selected current engine speed row is associated with an 'NDOT_SETPOINT (%/sec)' in a second column. This NDOT set point is multiplied by a factor '5_NDOT' (described below with reference to steps 66-72) and then associated with a certain rate of fuel flow (in pounds per hour), which is rate 'B'. More specifically, the EEC feeds the desired NDOT setpoint (from look up table 84) into the control loop and calculates an 'error' value (the difference between current measured NDOT and the desired NDOT setpoint). This 'error' is then fed into a proportional-integral loop that aims to close the gap of this error by commanding the necessary fuel flow, which is rate 'B'. As the fuel flow is modulated, the current measured NDOT should approach the desired NDOT setpoint (i.e. the error gets smaller). As the error gets smaller and smaller with each calculation cycle, the fuel flow changes get smaller and smaller. Accordingly, rate 'B' can then be used as a fuel flow rate command to a fuel metering valve controlling fuel flow into the combustor of the APU. Step 64 occurs continuously during APU starting (i.e. until APU reaches a normal operating speed such as 95%). Step 62 and step 64 occur simultaneously.

At step 66, the EEC inquires whether 'N %≥5%'. Current engine speed was determined during step 60, and is now compared to 5% of rated or maximum engine speed. While 5% engine speed is used in this example, this is a chosen trigger point and other relatively low engine speeds (such as 1%-20%, preferably 1%-10%) are also contemplated. If the answer is 'NO' (i.e. current engine speed is less than 5% of rated engine speed), then the EEC returns to step 60. If the answer is 'YES' (i.e. current engine speed is greater than or equal to 5% of rated engine speed), then the EEC proceeds to step 68.

At step 68, the EEC records time 'T'. More specifically, the time elapsed since the timer was initiated (at step 56) is recorded during step 68. Step 68 is configured to determine a time interval between engine starting (at step 58, which occurs simultaneously to step 56) and the moment at which the engine reaches a speed equal to, or greater than, 5% of maximum engine speed. Once time is recorded, the EEC then proceeds to step 70.

At step 70, the EEC calculates NDOT at 5% speed and names the result '5_NDOT'. To calculate 5_NDOT, the EEC takes 5% engine speed (determined at step 66) and divides by T (recorded at step 68). The result, 5_NDOT, represents actual engine acceleration in real-time under current operating conditions and can be used to better inform fuel flow control. Once 5_NDOT is calculated, the EEC then proceeds to step 72.

At step 72, the EEC populates the NDOT look up table 84. More specifically, 5_NDOT (calculated at step 70) is inserted into the 'NDOT SETPOINT' columns of both 'AT GROUND' and 'AT ALTITUDE' sub-tables of NDOT look up table 84. Within NDOT look up table 84, 5_NDOT is multiplied by a factor (e.g. 1.1, 1.2, 1.3) to calculate 'NDOT SETPOINT'. As described above with reference to step 64, the NDOT setpoint is associated with a certain rate of fuel flow, which is rate 'B'. Rate 'B' can then be used as a fuel flow rate command to a fuel metering valve controlling fuel flow into the combustor of the APU. As shown in lookup table 84, the calculation of NDOT setpoint includes 5_NDOT or acceleration. Once NDOT look up table 84 is populated, the EEC proceeds to step 74.

At step 74, the EEC inquires whether 'N %<95%'. Current engine speed was determined during step 60 and is now compared to 95%. If the answer is 'NO' (i.e. current engine speed is greater than 95% of rated engine speed), then the EEC proceeds to step 76. If the answer is 'YES' (i.e. current engine speed is less than 95% of rated engine speed), then the EEC proceeds to step 78.

At step 76, the EEC moves on to 'Steady State Fuel Control'. Once the APU has reached 95% of maximum rated speed (determined at step 74), method 52 of fuel flow control is supplanted with a different method of fuel control (not depicted) used during steady state operation of the APU.

At step 78, the EEC takes the lesser of rate 'A' and rate 'B'. If calculations in step 62 produced a fuel flow rate 'A' that was less than a fuel flow rate 'B' produced by calculations in step 64, then rate 'A' would be chosen by the EEC. The contrast is also true. If calculations in step 64 produced a fuel flow rate 'B' that was less than a fuel flow rate 'A' produced by calculations in step 62, then rate 'B' would be chosen by the EEC. Once the lesser of rate 'A' and rate 'B' is determined, the EEC proceeds to step 80.

At step 80, the EEC sends a fuel command to a fuel metering valve. More specifically, the EEC commands whichever fuel flow rate was determined in step 78 (rate 'A' or rate 'B') as the fuel flow rate for the fuel metering valve. The fuel metering valve then uses this commanded fuel flow rate to meter fuel to the combustor of the engine.

According to method 52, fuel command during APU engine starting is driven by either an EGT setpoint (rate 'A' calculated at step 62 using look up table 82) or a NDOT setpoint (rate 'B' calculated at step 64 using look up table 84). Whichever of the NDOT control loop output and the EGT control loop output results in a lower fuel flow rate, is chosen as the desired fuel flow rate at step 78 and commanded as the current fuel flow rate at step 80.

EGT setpoint look up table 82 is similar to EGT setpoint look up table 48 described about with reference to FIG. 2. NDOT look up table 84, however, is dynamic while NDOT look up table 50 described about with reference to FIG. 2 is static. For NDOT look up table 50, the NDOT SETPOINT is an "average" or general acceleration rate that is predetermined and pre-populated into NDOT look up table 50. In contrast, NDOT look up table 84 has an adaptive NDOT SETPOINT that factors in actual engine acceleration in real-time. By capturing engine acceleration, the NDOT SETPOINT is sensitive to the specific engine experiencing starting and ambient conditions.

Method 52 for controlling fuel flow is applicable to all APU starting conditions, but provides considerable benefit for cold start-ups of APUs having hydraulic accumulators. For example, if an engine is accelerating at 10%/second, then acceleration is preceding well and the NDOT SETPOINT should reflect this fact. If, however, an engine is accelerating at 1%/second, then acceleration is proceeding much more slowly than expected or average, and fuel flow needs adjustment in order to avoid any discontinuity or hiccup. Use of method 52 will result in lower temperature starts, more stability in the combustor, and lower incidence of failure to reach full engine operating speed.

Method 52 uses engine acceleration to better regulate fuel flow because acceleration inherently captures many unpredictable variables including, but not limited to: oil temperature, ambient air temperature, ambient air pressure, starter energy (e.g. hydraulic pressure, battery voltage, bleed air, etc.), and start drag (e.g. oil temperature, fuel temperature in gearbox driven fuel pump, gearbox drag, etc.). Instead of, or in addition to, using engine acceleration to augment NDOT SETPOINT the foregoing variables could be sensed/measured and used individually or collectively to augment NDOT SETPOINT. Instead of using the amount of time to reach 5% speed to determine acceleration (see steps 66-70), acceleration could be measured instantaneously, derived from a previous start sequence, or previewed by spinning a rotor prior to engaging a starter. Starter energy/drag could also be measured and used either independently or in addition to acceleration in order to augment NDOT SETPOINT. With a hydraulic starter system, hydraulic pressure and/or temperature could factor into NDOT SETPOINT. With an electric starter system, voltage and/or current and/or battery temperature could factor into NDOT SETPOINT. With a pneumatic starter, air pressure and/or temperature supplied could factor into NDOT SETPOINT.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for controlling fuel flow to a gas turbine engine during starting, the method comprising:
   monitoring acceleration of the gas turbine engine unit to determine an actual acceleration value;
   populating an acceleration based fuel command look-up table with the actual acceleration of the gas turbine engine unit during starting;
   calculating a fuel flow rate for a setpoint acceleration using the actual acceleration value as a factor; and
   commanding the calculated fuel flow rate to the gas turbine engine.

2. The method of claim 1, wherein monitoring the acceleration of the gas turbine engine comprises:
   monitoring a speed of the gas turbine engine to determine when the gas turbine engine reaches a set speed;
   recording time elapsed for the gas turbine engine to reach the set speed; and
   dividing the monitored speed by the recorded time to calculate the actual acceleration.

3. The method of claim 2, wherein the set speed is between about 1% and about 20% of maximum rated speed for the gas turbine engine.

4. The method of claim 2, wherein the set speed is about 5% of maximum rated speed for the gas turbine engine.

5. The method of claim 1, further comprising:
   comparing a fuel flow rate from a temperature based fuel command look up table with a fuel flow rate from the acceleration based fuel command look up table.

6. The method of claim 1, wherein an electronic engine control performs the method of claim 1.

7. A method for controlling fuel flow to an auxiliary power unit during starting, the method comprising:
   activating a starter for the auxiliary power unit;
   monitoring a speed of the auxiliary power unit;
   measuring an amount of time elapsed to reach a set speed to determine an actual acceleration of the auxiliary power unit;
   populating an acceleration look up table with the actual acceleration of the auxiliary power unit during starting; and
   controlling a rate of fuel flow to the auxiliary power unit during starting.

8. The method of claim 7, further comprising:
   comparing a first fuel flow rate from the acceleration look up table to a second fuel flow rate from an exhaust gas temperature ("EGT") look up table;
   selecting one of the first fuel flow rate and the second fuel flow rate as a desired fuel flow rate; and
   commanding the desired fuel flow rate to a fuel metering valve.

9. The method of claim 8, wherein selecting one of the first fuel flow rate and the second fuel flow rate includes choosing whichever fuel flow rate is lower.

10. The method of claim 8, wherein comparing the first fuel rate to the second fuel flow rate occurs continuously during starting of the auxiliary power unit.

11. The method of claim 7, wherein the set speed is between about 1% and about 10% of maximum rated speed.

12. The method of claim 7, wherein the set speed is about 5% of maximum rated speed.

13. The method of claim 9, wherein the starter is part of a hydraulic starting system.

14. An auxiliary power unit comprising:
   a starter for starting rotation of an engine;
   a speed sensor for sensing engine speed;
   a fuel metering valve for metering fuel flow to the engine; and
   a controller connected to the starter, the speed sensor, and the fuel metering valve, the controller receiving the sensed engine speed and calculating acceleration of the engine, the controller commanding a fuel flow rate to the fuel metering valve, wherein the fuel flow rate is determined in part by the calculated acceleration of the engine;
   wherein the calculated acceleration of the engine is used as a multiplying factor in determining the fuel flow rate; and
   wherein the controller populates an acceleration based fuel command look up table with the calculated acceleration of the engine during starting of the engine.

15. The auxiliary power unit of claim 14, wherein the controller compares a first fuel flow rate from the acceleration based fuel command look up table with a second fuel flow rate from temperature based look up table.

* * * * *